UNITED STATES PATENT OFFICE.

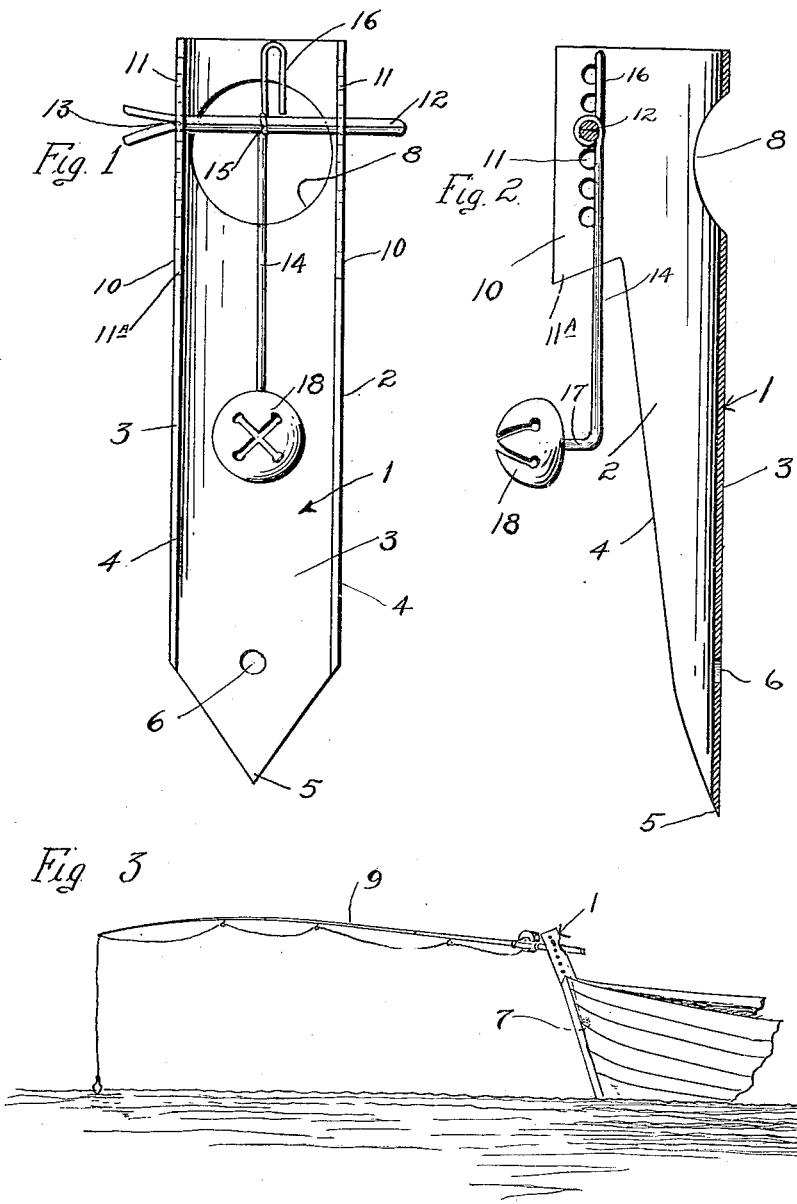

ALONZA C. HALL, OF RICHMOND, VIRGINIA.

FISHING-ROD SUPPORT.

1,131,508.  Specification of Letters Patent.  Patented Mar. 9, 1915.

Application filed March 6, 1914. Serial No. 822,955.

*To all whom it may concern:*

Be it known that I, ALONZA C. HALL, a citizen of the United States, residing at Highland Park, Richmond, in the county of Henrico and State of Virginia, have invented certain new and useful Improvements in Fishing-Rod Supports; and I do hereby declare the following to be a full, clear, and exact description of the invention, such as will enable others skilled in the art to which it appertains to make and use the same.

This invention relates to fishing rod supports, and one of the principal objects of the invention is to provide a device of simple construction which can be quickly connected to the bow or gunwale of a boat, or which can be quickly driven into the ground for supporting the fishing rod at any desired angle or inclination.

Another object of the invention is to provide a fishing rod support of simple construction which can be driven into the ground to support the rod at any desired inclination, or which may be connected to the boat, and which operate a signal in case a fish should nibble at the bait or be caught by the hook.

Still another object of the invention is to provide a fishing rod support which can be connected to the belt of the wearer and which can be used to advantage in digging bait.

These and other objects may be attained by means of the construction illustrated in the accompanying drawing, in which, Figure 1 is a front elevation of the fishing rod support, Fig. 2 is central vertical section through the same, and Fig. 3 is a side elevation of the fishing rod support connected to the bow end of a boat, in position for use.

Referring to the drawing, the numeral 1 designates the fishing rod support, which is preferably formed of sheet metal of the required gage or thickness, said support comprising the side flanges 2, bent at right angles to the web portion 3, and tapering or inclining downwardly as shown at 4, the lower end of the holder being pointed as shown at 5. In the portion 3 of the support, a hole 6 is formed to receive a screw eye 7 for connecting the device to the side or bow end of a boat. Formed in the web portion 3 of the support near the upper end thereof is an opening 8 to receive the handle end of the fishing rod 9. The flanges 2 are extended at their upper ends to form the enlarged support 10 spaced apart and provided with a series of perforations 11, to receive a split pin 12, the ends of which are bent outwardly to form a V-shaped notch 13 for holding a line. The fishing rod 9 may be inserted in the opening 8, and by adjusting the split pin 12 in any of the perforations 11, the rod may be supported at any desired inclination relatively to the water line. The lower end of the supporting flanges 10 are sharpened as at 11$^a$ to engage the gunwale of the boat or the bow thereof to hold the support firmly in place.

Suitably mounted upon the pin 12 is a signal which is adapted to be operated when the support is used for tight line fishing. This signal comprises a rod or wire 14 bent to form a ring or bearing 15 mounted on the pin 12, and an extended hook 16. Connected to the outwardly bent end 17 of the rod or wire 14 is a bell 18. This signal may be used by extending the hook end 16 through the opening 8 and connecting the fish line thereto and securing the line in the notch 13.

From the foregoing it will be obvious that the support may be used for digging bait by forcing the pointed end into the ground to be used like a spade or shovel. It will also be apparent that the device can be used for tight line fishing without a rod or for supporting a rod at any desired inclination.

The device may be readily carried in a belt, and is a simple, yet very useful and convenient device for use by anglers.

Various changes may be made in the details of construction without departing from the spirit and scope of the invention as defined in the claim.

What is claimed is:—

A fishing rod support comprising a sheet metal device having a pointed end, a perforation for receiving a screw eye to connect the support to the gunwale of a boat, said device being provided with spaced flanges having a series of perforations therein and a pin adjustably mounted in said perforations, said device being provided with an opening to receive a fishing rod and said pin adapted to be adjusted in said perforations to support the rod at any required inclination.

In testimony whereof I affix my signature in presence of two witnesses.

ALONZA C. HALL.

Witnesses:
J. W. MARSTON,
H. E. CARR.